(12) United States Patent
Axen et al.

(10) Patent No.: US 8,496,123 B2
(45) Date of Patent: Jul. 30, 2013

(54) PROCESS FOR CROSS-LINKING CELLULOSE ESTER MEMBRANES

(75) Inventors: Andreas Axen, Uppsala (SE); Anders Hagvall, Uppsala (SE); Anders Larsson, Uppsala (SE); Nicolas Thevenin, Uppsala (SE)

(73) Assignee: GE Healtcare Bio-Sciences AB, Uppsala (SE)

( * ) Notice: Subject to any disclaimer, the term of this patent is extended or adjusted under 35 U.S.C. 154(b) by 993 days.

(21) Appl. No.: 11/995,979

(22) PCT Filed: Jul. 24, 2006

(86) PCT No.: PCT/EP2006/007256
§ 371 (c)(1),
(2), (4) Date: Jan. 25, 2008

(87) PCT Pub. No.: WO2007/017085
PCT Pub. Date: Feb. 15, 2007

(65) Prior Publication Data
US 2008/0179248 A1    Jul. 31, 2008

(30) Foreign Application Priority Data

Jul. 29, 2005 (GB) .................................. 0515577.5

(51) Int. Cl.
*B01D 39/18* (2006.01)
*B01D 39/04* (2006.01)
*B01D 71/00* (2006.01)

(52) U.S. Cl.
USPC ................ 210/500.3; 210/500.29; 210/500.1; 210/634

(58) Field of Classification Search
USPC .................... 210/634, 500.1, 500.21, 500.27, 210/500.28, 500.29, 500.37, 500.41, 500.3, 210/656
See application file for complete search history.

(56) References Cited

U.S. PATENT DOCUMENTS

| 4,005,012 | A | * | 1/1977 | Wrasidlo ....................... 210/654 |
| 5,334,638 | A | | 8/1994 | Kuo et al. |
| 5,739,316 | A | | 4/1998 | Beer et al. |
| 6,537,793 | B2 | | 3/2003 | Blanche et al. |
| 6,851,561 | B2 | * | 2/2005 | Wu et al. ........................ 210/490 |
| 6,960,617 | B2 | * | 11/2005 | Omidian et al. .............. 521/102 |
| 7,423,070 | B2 | * | 9/2008 | Larsson et al. ................ 521/138 |
| 2004/0106190 | A1 | * | 6/2004 | Yang et al. .................. 435/287.2 |
| 2004/0206694 | A1 | | 10/2004 | Charkoudian |
| 2006/0096912 | A1 | | 5/2006 | Nussbaumer et al. |

FOREIGN PATENT DOCUMENTS

| DE | 44 18 831 | | 12/1995 |
| EP | 0 145 127 | | 6/1985 |
| EP | 0 214 346 | | 3/1987 |
| EP | 0 483 143 | | 6/1994 |
| EP | 1 470 854 | | 10/2004 |
| JP | 02055701 | | 2/1990 |
| WO | 95/13125 | | 5/1995 |
| WO | 95/32793 | | 12/1995 |
| WO | WO 2004/003542 | * | 1/2004 |

OTHER PUBLICATIONS

Guo et al. A new matrix for membrane affinity chromatography and its application to the purification of concancavalin A. Journal of Membrane Science. 182 (2001) 227-234.*
Charcosset, Catherine. Review: Purification of proteins by membrane chromatography. J. Chem. Technol. Biotechnol. 71 (1998) 95-110.*
Ruckenstein et al. Topical paper: Cellulose and glass fiber affinity membranes fro teh chromatographic separation of biomolecules. Biotechnol. Prog. 20 (2004) 13-25.*

* cited by examiner

*Primary Examiner* — Katherine Zalasky

(57) ABSTRACT

The invention relates to a process for making porous cross-linked cellulose membranes and processes for coupling a chromatography ligand to cross-linked cellulose membranes. The invention provides methods for separating a first component from a second component in a solution based upon a difference in the size of the first and second components, and methods for separating target molecules from other components in a solution comprising use of membranes obtainable by the process of the invention. The method has particular utility in separating proteins from cell lysates and cultures.

31 Claims, No Drawings

SEQUENCE LISTING

```
<160> NUMBER OF SEQ ID NOS: 1

<210> SEQ ID NO 1
<211> LENGTH: 6
<212> TYPE: PRT
<213> ORGANISM: Artificial Sequence
<220> FEATURE:
<223> OTHER INFORMATION: Synthetic Peptide

<400> SEQUENCE: 1

Cys Cys Pro Gly Cys Cys
1               5
```

PROCESS FOR CROSS-LINKING CELLULOSE ESTER MEMBRANES

CROSS-REFERENCE TO RELATED APPLICATIONS

This application is a filing under 35 U.S.C. §371 and claims priority to international patent application number PCT/EP2006/007256 filed Jul. 24, 2006, published on Feb. 15, 2007, as WO 2007/017085, which claims priority to patent application number 0515577.5 filed in Great Britain on Jul. 29, 2005.

FIELD OF THE INVENTION

The present invention relates to processes for cross-linking cellulose ester membranes to increase their physical strength and resistance to base hydrolysis. Processes for activating and coupling the membranes to chromatography ligands are also described, as are methods for separating target molecules from solutions using membranes produced by the process of the invention.

BACKGROUND OF THE INVENTION

Chromatographic separation of target molecules is of great commercial interest in the chemical and biotechnological fields, such as the large-scale production of novel biological drugs and diagnostic reagents. Furthermore, the purification of proteins has recently become of great significance due to advances in the field of proteomics, wherein the function of proteins expressed by the human genome is studied.

In general, proteins are produced in cell culture, where they are either located intracellularly or secreted into the surrounding culture media. Since the cell lines used are living organisms, they must be fed with a complex growth medium, containing sugars, amino acids, growth factors, etc. Separation and purification of a desired protein from the complex mixture of nutrients and cellular by-products, to a level sufficient for therapeutic usage, poses a formidable challenge.

Porous polysulphone and cellulosic membranes are widely used for filtering and separating chemical and biological mixtures (cf. EP 0483143). These membranes include ultra- and microfiltration membranes, in which the filtration process is based on a hydrostatic pressure differential. Ultra-filtration membranes are characterised by pore sizes which enable them to retain macromolecules having a molecular weight ranging between 500 and 1,000,000 daltons. Microfiltration membranes exhibit permselective pores ranging in diameter between 0.01 and 10 μm.

Cellulosic hydrate and ester membranes are well known in the membrane filtration art and present a unique combination of advantageous characteristics, including hydrophilicity, which permits wettability without the use of surfactants. Such membranes also exhibit minimal protein adsorption, high resistance to heat and a high degree of flexibility.

However, despite their widespread usage, cellulosic membranes suffer a number of disadvantages, including susceptibility to attack by strong acids and bases, and by cellulase enzymes. Sensitivity to bases is characterised initially by shrinkage and swelling, ultimately leading to decomposition of the membrane. High temperatures promote chemical disintegration and shrinkage while low temperatures, especially in connection with substantial concentrations of alkali, promote swelling and bursting. The pore structure of the membrane can easily be destroyed resulting in a dramatic decrease in the flow rate through the membrane. The alkali sensitivity of cellulose membranes is a marked disadvantage when, for example, strongly alkaline cleaning media are required to clean the membrane to restore its filtration capacity.

Cellulases are encountered in the brewing industry, and also develop spontaneously from microorganisms that grow on cellulose membranes during prolonged storage in a non-sterile environment. Cellulases attack the membranes by decomposing the cellulosic polysaccharides therein into smaller chemical fragments such as glucose. When cellulose hydrate membranes decompose, some of the byproducts of the decomposition lead to the formation of so-called "pseudopyrogens" or fever-producing substances which mitigates against the use of cellulose hydrate membranes in the filtration of pharmaceutical products.

From the experience of the textile industry, it has long been known that better characteristics may be imparted to cellulosic fibers by cross-linking (cf. Kirk-Othmer's Encyclopedia of Chemical Technology, Vol. 22, pp 770-790 (3rd Ed. 1983)). Such cross-linking is particularly desirable in order to improve the physical strength and chemical resistivity of the cellulosic membranes. Furthermore, where chemical derivitization of the membranes is desirable, for example in order to couple protein binding ligands to the hydroxyl groups of the cellulose polymers, base sensitivity is particularly important.

A process for cross-linking regenerated cellulose hydrate membranes, for use in the separation of ketone dewaxing solvents from dewaxed oil, is disclosed in EP 0145127, the process comprising contacting cellulose hydrate membranes with a solution of a cross-linking agent. However, the cross-linked membrane products exhibited considerable degradation in their hydrophilic properties as compared to the original membrane. Moreover, with increased cross-linking, the flux of such membranes dramatically decreases by about 80% compared to the flux of non-cross-linked cellulose hydrate membranes. Furthermore, cross-linking with the bifunctional reagents, because of their low water-solubility, required the use of organic or aprotic solvents, which makes the process technically difficult and expensive.

EP 0214346 describes a process for cross-linking cellulose acetate membranes, to enhance their resistance to organic liquids, for use in the separation of polar solvents such as ketone dewaxing solvents present in dewaxed oil. Cross-linking is achieved by use of bifunctional reagents which are reactive with the hydroxyl groups present in the structure of the cellulose acetate membrane. It should be noted that the bifunctional reagents react directly with the free hydroxyl groups present in the cellulose acetate membrane, there being no disclosure of any removal of the acetate groups by base hydrolysis in the document.

U.S. Pat. No. 5,739,316 teaches a process for cross-linking cellulose hydrate membranes with a water-soluble diepoxide (such as 5-ethyl-1,3-diglycidyl-5-methylhydantion) in the presence of a base. The alkaline medium acts as a catalyst for the reaction of the diepoxide with the cellulose and also in deactivating the adverse effect water has on the cellulose. Applications cited for the membranes include use in the separation of aqueous/oil emulsions and the separation of proteins from biotechnically produced aqueous media and beverages.

A process by which cross-linked cellulose hydrate membranes are produced is disclosed in US 2004/0206694. A regenerated cellulose hydrate membrane is treated with epichlorohydrin under basic and reducing conditions to yield an epoxidised cross-linked product. This product may be further treated with a nucleophilic amine reagent (e.g. dimethylethylenediamine) to provide a positively charged cross-linked cellulose membrane. Alternatively, a negatively charged membrane may be obtained by reaction of the epoxidised cross-linked product with sodium chloroacetate under basic conditions.

A one step process for producing positively or negatively charged membranes is also described in which glycidyl reagents having epoxide groups and groups capable of possessing charge (e.g. glycidyl quaternary compound or glycidyl acid) can be reacted directly with hydroxyl polymers under basic conditions.

BRIEF SUMMARY OF THE INVENTION

Accordingly, it is an object of the present invention to cross-link cellulose ester membranes in a process that does not adversely affect either their high flux/flow rates nor their minimal protein adsorption and flexibility, and to impart to the membranes an increased resistance to bases in order to allow further chemical modification with chromatography ligands. It is another object of the present invention to provide a process for coupling a chromatography ligand to the hydroxyl groups of the cross-linked membranes, either directly or following subsequent chemical modification. It is a further object of the invention to provide membranes prepared by the aforementioned processes. Such membranes can be used to separate components of a solution based upon differences in their size and shape. A further object of the invention is to provide methods for separating target molecules from other components in a solution using said membranes based upon the binding affinities of the target molecules.

DETAILED DESCRIPTION OF THE INVENTION

Definitions

The term "cross-linked", as applied in the context of the present invention, will be taken to mean that there is a side bond between different chains or parts of a single chain of a polymer (i.e. cellulose polymer) which increases its rigidity and/or stability.

In the specification the term "membrane" will mean a thin sheet or layer, usually pliable in nature, which comprises a plurality of pores and which generally acts as a filter between a solution placed on one surface and its opposing surface.

The term "base" will take its conventional chemical meaning as a substance with a tendency to gain protons. Thus, for instance, a base is a substance which in aqueous solution reacts with an acid to form a salt and water only and is therefore a substance which provides hydroxyl ions.

The term "bifunctional reagent" as used herein will mean a compound with two reactive functional groups that can interact with two groups in one molecule or with one group in each of two different molecules.

"Substantially simultaneously" will be taken to mean that hydrolysis and cross-linking will take place essentially in parallel, in such way that some of the hydroxyl groups made available by hydrolysis will participate in the cross-linking reaction.

It will be understood that the term "target molecule" embraces any compound or entity which is targeted for adsorption by the method of the invention.

According to a first aspect of the invention, there is provided a process for making a porous cross-linked cellulose membrane comprising adding a base to a membrane which comprises a plurality of cellulose ester groups in the presence of an aqueous solution of a bifunctional reagent under conditions which allow hydrolysis of said ester groups to hydroxyl groups and cross-linking of said hydroxyl groups with said bifunctional reagent, characterised in that said hydrolysis and cross-linking occur substantially simultaneously. It will be understood by the person skilled in the art that the cellulose membrane may initially comprise some free hydroxyl groups in addition to the plurality of ester groups. These free hydroxyl groups can take part in the cross-linking reaction with the bifunctional reagent.

Suitably, the base is selected from the group consisting of sodium hydroxide, potassium hydroxide, calcium hydroxide, barium hydroxide, tetraalkylammonium hydroxide, sodium carbonate, caesium carbonate, sodium triphosphate, sodium silicate, potassium carbonate, potassium silicate, potassium triphosphate and sodium hydrogencarbonate. Preferably the base is sodium hydroxide.

Suitably, the cellulose ester is selected from the group consisting of cellulose acetate, cellulose nitrate, cellulose xanthate, cellulose propionate, cellulose butyrate, cellulose benzoate and a mixture thereof. Preferably the ester is cellulose acetate.

Suitably, the bifunctional reagent is selected from the group consisting of epichlorohydrin, epibromohydrin, diisocyanate, dimethyl urea, dimethyl ethylene urea, dimethylchlorosilane, bis(2-hydroxy ethyl sulfone), glycidyl ether, butanediol diglycidyl ether, divinylsulfone, alkylene dihalogen and hydroxyalkylene dihalogen.

Suitably, the glycidyl ether is selected from the group consisting of butanediol diglycidyl ether, ethylene glycol diglycidyl ether, glycerol diglycidyl ether and polyethylene glycol diglycidyl ether.

Preferably the bifunctional reagent is epicholorhydrin (ECH). Epichlorohydrin is also known as 3-chloropropylene oxide; chloromethyloxirane and 1-chloro-2,3-epoxypropane.

Optionally, a mixture of bifunctional reagents is used. Preferably, the process is carried out in the presence of an inorganic salt.

More preferably, the salt is sodium sulphate.

Suitably, the process additionally comprises the step of adding a water-miscible solvent to increase the solubility of the bifunctional reagent. It will, however, be understood that the concentration of the solvent must be below the level where the cellulose ester membrane dissolves or starts to swell.

Suitably, the solvent is selected from the group consisting of alcohol, ketone and ether. Preferably, the solvent is selected from the group consisting of methanol, ethanol, ethylene glycol, glycerol, propylene glycol, acetone, tetrahydrofurane, dioxane and diglyme.

Suitably, the water-miscible solvent is added to a final concentration of no more than 50% v/v. Preferably, the water-miscible solvent is added to a final concentration of around 25% v/v.

Suitably, the process is carried out at a temperature of 20° C. to 70° C. for a period of 30 minutes to 48 hours. Preferably, the process is carried out at a temperature of 25° C. to 60° C., more preferably at a temperature of 45° C. to 55° C., for a period of 30 minutes to 48 hours. Preferably, the process is carried out at a temperature of 25° C. to 60° C. for a period of 2 to 24 hours. More preferably, the process is carried out at a temperature of 45° C. to 55° C. for a period of 2 to 24 hours.

Preferably, the membrane comprises a plurality of cellulose acetate groups.

More preferably, the membrane comprises a plurality of cellulose acetate groups. The base is sodium hydroxide and the bifunctional reagent is epichlorohydrin.

Most preferably, the process is carried out at a temperature of 45° C. to 55° C. for a period of at least 1 hour. Preferably, the process is carried out at a temperature of 47° C.

Suitably, wherein the bifunctional reagent is epichlorohydrin, the process further comprises the step of adding additional aqueous epichlorohydrin solution and base under conditions which allow hydrolysis of the ester groups to hydroxyl groups and epoxy activation of the hydroxyl groups with epichlorohydrin to produce an epoxy activated cross-linked cellulose membrane.

In one embodiment, the process comprises a subsequent step of attaching chromatography ligands to hydroxyl groups of the cross-linked cellulose membrane. Attaching chromatography ligands, also known as functionalisation or sometimes derivatisation, may be provided by attaching charged or chargeable groups to prepare an ion-exchange matrix; by attaching groups that exhibit biological affinity to prepare an affinity matrix; by attaching chelating groups to make an immobilised metal affinity chromatography (IMAC) matrix; or by attaching hydrophobic groups to make a hydrophobic interaction chromatography (HIC) matrix. In a specific embodiment, the functional groups are ion-exchange ligands selected from the group consisting of quaternary ammonium (Q), diethylaminoethyl (DEAE) groups. Examples of other ion-exchange groups include, for example, diethylaminopropyl, sulphopropyl (SP), and carboxymethyl (CM) groups.

Methods for attachment of functional groups to a solid support such as a separation matrix are well known to the skilled person in this field and may involve a preceding step of allylation of the substituent and use of standard reagents and conditions. (see e.g. Immobilized Affinity Ligand Techniques, Hermanson et al, Greg T. Hermanson, A. Krishna Mallia and Paul K. Smith, Academic Press, Inc., 1992.) The cross-linked cellulose membranes of the present invention may also be provided with extenders, also known as flexible arms, tentacles, or fluff, before functionalisation. A well-known extender is dextran, see e.g. U.S. Pat. No. 6,537,793 wherein addition of extenders to a polysaccharide matrix is described in more detail.

Preferably, the process further comprises the step of coupling a chromatography ligand to the epoxy activated cross-linked cellulose membrane. Preferably, the ligand comprises an amine or thiol group. More preferably, the amine is ammonia.

Suitably, the process as hereinbefore described further comprises the step of coupling a chromatography ligand to the cross-linked cellulose membrane.

Suitably, the coupling involves a first oxidation step and a second reductive amination step. Preferably, the first oxidation step comprises treatment of the membrane with a periodate solution. Preferably, the second reductive amination step comprises treatment of the membrane with sodium borohydride (NaBH4).

Suitably, the ligand comprises an amine group. Preferably, the amine is a secondary amine. More preferably, the secondary amine is Bis (3-aminopropyl) amine.

Suitably, the ligand comprises a glycidyl quaternary ammonium compound such as glycidyl trimethyl ammonium chloride (GMAC). Suitably, the coupling of said glycidyl quaternary ammonium compound involves use of a base in the presence of a reducing agent. Preferably, the reducing agent is sodium borohydride. Preferably, the base is sodium hydroxide.

In a second aspect of the present invention, there is provided a porous cross-linked cellulose membrane prepared by a process comprising adding a base to a membrane which comprises a plurality of cellulose ester groups in the presence of an aqueous solution of a bifunctional reagent under conditions which allow hydrolysis of the ester groups to hydroxyl groups and cross-linking of the hydroxyl groups with the bifunctional reagent, characterised in that the hydrolysis and cross-linking occur substantially simultaneously.

According to a third aspect of the present invention, there is provided a method for separating a first component from a second component in a solution or a suspension based upon a difference in the size of the first and second components, the method being a method of micro-filtration or ultra-filtration, comprising use of the membrane as hereinbefore described.

Micro-filtration is defined as a low pressure membrane filtration process which removes suspended solids and colloids generally larger than 0.1 µm in diameter. Such processes can be used to separate particles or microbes that can be seen with the aid of a microscope such as cells, macrophage, large virus particles and cellular debris.

Ultra-filtration is a low-pressure membrane filtration process which separates solutes up to 0.1 µm in size. Thus, for example, a solute of molecular size significantly greater than that of the solvent molecule can be removed from the solvent by the application of a hydraulic pressure, which forces only the solvent to flow through a suitable membrane (usually one having a pore size in the range of 0.001 to 0.1 µm). Ultra-filtration is capable of removing bacteria and viruses from a solution.

The membrane according to the invention may also be used for the isolation of a target compound, particularly biomolecules. Such biomolecules include, but are not limited to, proteins, monoclonal or polyclonal antibodies, peptides (e.g. dipeptides or oligopeptides), nucleic acids (e.g. DNA, RNA) peptide nucleic acids, viruses and cells (such as bacterial cells, prions etc.). Alternatively, the membrane is useful to isolate organic molecules, such as metabolites and drug candidates. In an alternative embodiment, the present membrane is useful in identifying any one of the above discussed target compounds, such as for diagnostic purposes. Thus, the products purified using the present membrane may be drugs or drug targets; vectors for use in therapy, such as plasmids or viruses for use in gene therapy; feed supplements, such as functionalized food; diagnostic agents etc. A specific application of a biomolecule purified according to the invention is a drug for personalized medicine. The membrane according to the invention is also useful in purifying a desired liquid from an undesired target compound, such as those described above.

Thus in a fourth aspect of the present invention, there is provided a method for separating a target molecule from other components in a solution, said method being a method of chromatography, comprising use of the membrane as hereinbefore described.

The term chromatography embraces a family of closely related separation methods. Such methods are all based on the feature that two mutually immiscible phases are brought into contact, wherein one phase is stationary and the other mobile. In the present invention, the membrane constitutes the stationary phase while the solution will constitute the mobile phase. Chromatography can be used either to purify a liquid from a contaminating compound or to recover one or more specific compounds from a liquid.

Conventionally, cells and/or cell debris has been removed by filtration. Once a clarified solution containing a protein of interest has been obtained, its separation from the other components of the solution is usually performed using a combination of different chromatographic techniques. These techniques separate mixtures of proteins on the basis of their charge, degree of hydrophobicity, affinity properties, size etc. Several different chromatography matrices are available for each of these techniques, allowing tailoring of the purification scheme to the particular protein involved. In the context of the present invention, the protein may be separated predominantly on the basis of charge and/or affinity properties.

Suitably, the target molecule comprises a binding moiety that binds to the chromatography ligand present in the membrane.

Suitably, the target molecule is a protein. The target molecule may be polynucleotide or a natural product. Preferably, the target molecule is a protein.

Preferably, the target molecule is a protein and the solution is a cell extract, cell lysate or cell culture.

Suitably, the ligand is positively or negatively charged.

Suitably, the ligand and the binding moiety are members of a specific binding pair, wherein each component has a specific binding affinity for the other. Preferably, the ligand and the binding moiety are selected from the group consisting of biotin/steptavidin, biotin/avidin, biotin/neutravidin, biotin/captavidin, epitope/antibody, GST/glutathione, His-tag/Nickel, antigen/antibody, FLAG/M1 antibody, maltose binding protein/maltose, chitin binding protein/chitin, calmodulin binding protein/calmodulin (Terpe, 2003, Appl Microbiol Biotechnol, 60, 523-533), LUMIO™ reagents/LUMIO™ recognition sequence. The LUMIO™ reagents and recognition sequence (Cys-Cys-Pro-Gly-Cys-Cys (SEQ ID NO: 1)) are available from Invitrogen Life Corporation, Carlsbad, Calif., USA.

Other examples of ligand/binding moieties are enzyme inhibitor/enzymes (e.g. benzamidine or arginine and serine proteases such as catalase), heparin/coagulation factors, lysine/plasminogen or ribosomal RNA, Procion Red/NADP+ dependent enzymes, Cibacron Blue/serum albumin, Concanavalin A/glucopyranosyl and mannopyranosyl groups, and Protein A or Protein C/Fc region of IgG.

EXAMPLES

The present examples are provided for illustrative purposes only, and should not be construed as limiting the invention as defined by the appended claims. All references given below and elsewhere in the present specification are hereby included herein via reference.

Example 1

Crosslinking of Cellulose Acetate Membranes 0.65 μm Cellulose Acetate (CA) membranes, available from Sartorius AG, were used in all studies. CA membranes were crosslinked with epichlorhydrin (hereinafter 'ECH', from Resolution Sverige AB, P.O. Box 606, 3190 AN Hoogvliet Rt, The Netherlands) and NaOH. The membranes were kept in place with forceps during the cross-linking process and washed with water after cross-linking was complete.

All cross-linked membranes were washed with distilled water (four times with 0.6 L). The flow time was measured with 1 L of water and with the method described below (cf. 'Flow Time Measurement'). A summary of the experiments performed on the membranes can be found in Tables 1 and 2.

Reference/Control Membrane

The membrane was weighed and left in distilled water for 3.5 weeks. The flow time was 88 s and 88 s (p∞–0.88 bar); it seems that the flow time of a 0.65 μm CA membrane can increase from 65-70 s to 85-90 s on storing in distilled water. The membrane was dried in a vacuum cupboard over 48 hours and found to weight 78.79 mg compared to 79.77 mg for a new membrane. The weight decrease is of the normal range for washing with water followed by drying under vacuum. The flow time was measured again to see if it would return to the normal value for untreated membranes. The flow time was 92 s and 93 s (p∞–0.89). The membrane was stored in distilled water over night and the flow time measured twice as 70 s on both occasions (p∞–0.89 bar).

Sample K2C:

2554 of ECH (epichlorohydrin) was dissolved in 100 mL of distilled water at 45° C. A 0.65 μm CA membrane was placed in the solution and kept in place with a pair of forceps. 5 mL of 1.0M NaOH was added and the membrane was left for 2 h at 45° C.

Sample K7C:

A wetted membrane (K7) was placed in a 100 mL Duran flask containing 10 g of $Na_2SO_4$ and 2.50 mL of ECH in 100 mL of water. It was uncertain if some ECH had evaporated. The membrane (K7) appeared stiffer when it had been in contact with the solution. 1.688 mL of 50% NaOH was dosed at a rate of 0.028 mL/min. The membrane was left over night and the pH measured, giving a result of pH 13 to 14.

Sample K8C:

A wetted membrane (K8) was placed in a 100 mL Duran flask containing 2.50 mL of ECH in 100 mL of water. 1.688 mL of 50% NaOH was dosed with 0.028 mL/min. The membrane was left over night and the pH was measured around 12.

Sample K9C:

1.00 mL of ECH was added to 100 mL of water and was dissolved with stirring at room temperature. 10 g of $Na_2SO_4$ was added when the ECH had dissolved. The Duran flask containing the solution was put in a water bath and was heated to 47° C. A wetted membrane (K9) was placed in the Duran flask. 0.674 mL of 50% NaOH was dosed (0.020 mL/min) in 34 min. The membrane was left in the solution for 4 h after all of the base had been added.

Sample K10C:

10 g of $Na_2SO_4$ was dissolved in 100 mL of water. 1.00 mL of ECH was added with slow stirring and the Duran flask was left without stirring for 2.75 h. The flask was placed in a water bath (47° C.) once all the ECH had dissolved. 0.674 mL of 50% NaOH was dosed at a rate of 0.020 mL/min for 34 min. The membrane was left in the solution for 1 h after all of the base had been added. The pH was measured as 13 to 14.

Sample L1C:

1.00 mL of ECH was added to 100 mL of water and was dissolved with stirring at room temperature. 10 g of $Na_2SO_4$ was added when the ECH had dissolved. The Duran flask containing the solution was put in a water bath and was heated to 25° C. (pH 6-7). A wetted membrane (L1, 78.99 mg) was placed in the Duran flask. 0.674 mL of 50% NaOH was dosed (0.020 mL/min) in 34 min (pH 13-14). The membrane was left in the solution at 25° C. for 18 h once the base dosing was complete (pH 12-13).

Sample L2C:

0.50 mL of ECH was added to 100 mL of water and was dissolved with stirring at room temperature. 10 g of $Na_2SO_4$ was added when the ECH had dissolved. The Duran flask containing the solution was put in a water bath and was heated to 47° C. A wetted membrane (L2, 78.74 mg) was placed in the Duran flask and 0.336 mL of 50% NaOH dosed at a rate of 0.020 mL/min for 17 min. The membrane was left in the solution at 17° C. for 18 hours (pH 11-12).

Sample L3C:

1.00 mL of ECH was added to 100 mL of water and was dissolved with stirring at room temperature. 10 g of Na2SO4 was added when the ECH had dissolved. The Duran flask containing the solution was put in a water bath and was heated to 30° C. A wetted membrane (L3, 78.77 mg) was placed in the Duran flask.

0.674 mL of 50% NaOH was dosed (0.020 mL/min) in 34 min (pH∞14). The membrane was left in the solution at 30° C. over night. In total the membrane was left for 17.25 h after that the base dosing had ended. The membrane was washed and the flow measured.

Sample L4C:

The sample was treated in the same manner as sample K9C (see Table 1). The pH was determined as pH 12-13 post reaction.

Sample M1C:

This sample was prepared in the same way as sample L4C (see Table 1) with the exception that only 5 g of $Na_2SO_4$ was added.

Sample M3C:

This sample was prepared in the same way as sample L4C with the exception that the sample was left in the reaction mixture for 4.5 h (Table 1). The pH was measured as pH 12-13 post reaction.

M5C:

2.5 mL of ECH was added to 100 mL of water and was dissolved with stirring at room temperature. 10 g of $Na_2SO_4$ was added when the ECH had dissolved. The Duran flask containing the solution was put in a water bath and was heated to 47° C. A wetted membrane (M5, 79.20 mg) was placed in the Duran flask.

1.688 mL of 50% NaOH was dosed with 0.020 mL/min (84 min). The membrane was left at 47° C. for 21 h after the end of the dosing before it was washed (pH 13-14). A flow time of 57 s and 57 s was measured at p∞−0.91 bar.

Flow Time Measurement

The water flow through the membrane was determined as an approximate measure of the differences in the pore structure of the membranes following cross-linking. A change in the flow indicated a change in the pore structure. Water was measured in a measuring cylinder and added to a membrane filter funnel connected to a vacuum flask. The vacuum flask was connected to a central vacuum (approx. −0.9 bar) and a pressure gauge was used to measure the pressure. The flow time was measured for 1 liter. The membrane filter funnel was filled (approx. 0.25 L) and the rest of the water was added more or less continuously as the water went through the membrane. The flow rates and pressures observed are shown in Tables 1 and 2.

Flow Properties

The flow properties were determined by measuring the time it took for 1 L of water to pass through the membrane; this time is referred to as the 'flow time' hereafter. The flow time of an untreated 0.65 μm CA membrane was usually around 65-70 s. The flow time for an untreated membrane did however increase slowly if it was stored in water (see 'Reference/Control Membrane' above). As an example a membrane that had been stored 3.5 weeks in distilled water had a flow time of 85-90 s. After drying and rewetting overnight the flow time was 70 s. Thus it seemed possible to reverse the effect by drying and then rewetting the membrane.

The flow time of the cross-linked membranes was approximately the same as for an untreated CA membrane. Furthermore, the flow times were lower than for an untreated membrane that had been stored in water for approximately two weeks (flow time as much as 85-90 s). The measured flow times (see Table 1 and Table 2) were in the range 65-90 s. This indicated that the cross-linking did not cause any significant changes in the pore structure of the membranes. Both the amount of cross-linker and the cross-linking conditions varied in the experiments. The flow properties of the cross-linked membranes were seen to improve if the cross-linking was made in the presence of sodium sulphate (e.g. samples K7C and K8C in Table 1).

Resistance of Cross-Linked Cellulose Acetate Membranes to Base

The membranes K2C and L1C were treated with of 1.0M NaOH for 2 h as a test of the cross-linking (K2C was placed in approximately 20 mL and L1C in 25 mL). If the base treatment did not change the flow time then that was taken as an indication that the cross-linking had taken place and provided protection from any structural changes due to base treatment. In contrast, a reduced flow would be taken as an indication that some structural change had occurred to the pore structure of the membrane.

The flow was decreased, in a significant way, only for the least cross-linked membrane (K2CH), see Table 3. That membrane was also the only one that lost weight to any noteworthy degree. The other membrane maintained approximately the same flow time and weight as before base treatment. These results indicated that the cross-linking had been successful. Even membrane K2CH seemed to have been cross-linked since it had superior flow properties to uncross-linked membranes after similar treatment. The flow for an uncross-linked membrane decreased dramatically after 2.5 min treatment with 1.0M NaOH. That the membrane L1CH demonstrated no significant weight change indicates that most of the acetate groups had been cleaved off and that the membrane was thus composed of predominantly cross-linked cellulose rather than of cross-linked cellulose acetate.

Example 2

Epoxy activation of CA Membranes

An epoxy activated membrane (K10CE) was prepared as described in Table 1. The membrane was first cross-linked by ECH at 47° C., as described for K100 above, the temperature then reduced to 25° C. and more ECH and NaOH added (see Table 1).

The reaction temperature was decreased (compared to the cross-linking reaction) and an excess of ECH was used in the epoxy activation step. The goal was to increase the amount of epoxy groups left on the membrane after the reaction. There should be a reasonably high amount of remaining epoxy groups on the membrane after the reaction.

From the results in Table 1 (see K10CE) it is evident that the membrane retained its flow properties following cross-linking.

Epoxy activation has the advantage that it can be made with less reaction steps than the oxidation and reductive amination method described below.

Example 3

Coupling of Ligands with Amine Functions to Cross-Linked Membranes via Oxidation and Amination The amine bis(3-aminopropyl)amine was used as a model substance for attachment of ligands. The amine was coupled to the cross-linked membrane through oxidation and reductive amination.

Stage 1: Oxidation with Sodium Periodate

As most of the acetate groups in the membrane had been cleaved off during the cross-linking reaction, the cross-linked membranes could thus be oxidised directly. $NaIO_4$ was dissolved in distilled water in a 150 mL-beaker. The beaker was placed on a shaking board and a membrane that had been hydrolysed and washed was added. The membrane was left for 2 h at room temperature and then washed with distilled water. Varying amounts of $NaIO_4$ was used in different experiments as described below:

Sample K9CO:

Membrane K9C was wetted and added to a $NaIO_4$ solution (2.0 g in 20 mL distilled water). 20 mL of distilled water was added. The membrane was left for 2 h and was then washed with 6 portions of 0.6 L water. The membrane was dried under vacuum over night and then weighed (48.57 mg). A small sample was removed and the membrane weighed again (48.49 mg). This sample of the membrane took on a dark purple coloration (almost black) when it was treated with SCHIFF's reagent (obtained from Sigma-Aldrich). The colour indicates that the membrane contains aldehyde groups, the stronger the colour the more aldehydes.

Sample L2CO:

Membrane L2C was added to a $NaIO_4$ solution (1.0 g in 20 mL distilled water) and left for 2 h before it was washed. Flow time 80 s and 85 s ($\infty$–0.93 bar).

Sample K7CO:

99.8 mg $NaIO_4$ was dissolved in 20 mL of distilled water. Membrane K7C was added to the solution. The membrane was oxidized for 2 h and then washed (flow time 70 s, 71 s at p$\infty$–0.91 bar). The membrane was dried under vacuum over night. It was weighed (50.30 mg) and then a small piece cut off and reweighed (50.93 mg). It was noted that this weight was lower than the original weight. On treatment with SCHIFF's reagent, the sample taken from the membrane took on a dark purple coloration.

Sample L4CO:

100.7 mg $NaIO_4$ was dissolved in 20 mL of distilled water. Membrane L4C was added to the solution. The membrane was oxidized for 2 h and then washed. The flow time was measured (flow time 73 s, 73 s at p$\infty$–0.92 bar). The membrane was dried under vacuum over night. The membrane was dried and weighed before (50.19 mg) and after (50.20 mg) a small sample was removed for reaction with the SCHIFF's reagent. This small sample became dark purple on treatment with the SCHIFF's reagent.

Sample M3CO:

336.1 mg $NaIO_4$ was dissolved in 20 mL of distilled water. Membrane M3C was added to the solution. The membrane was oxidized for 2 h and then washed. The flow time was then measured (flow time 72 s, 75 s at p$\infty$–0.91 bar).

Stage 2: Reductive Amination

Bis (3-aminopropyl)amine (obtained from Labchem) was dissolved in distilled water or methanol in a 150 mL-beaker. An oxidised membrane (i.e. samples K9C0, L2C0, K7C0, L4C0) was added and after a set time (usually 2 h) sodium borohydride ($NaBH_4$, 95%, Sigma-Aldrich) was added. After at least 2 h treatment with the reductive agent, the membrane was washed.

Sample K9COA:

5.9 mL of bis(3-aminopropyl)amine was added to 20 mL of methanol. Membrane K9C0 was wetted in methanol and then added to the amine solution. After 2 h 0.5 g of $NaBH_4$ was added to the reaction; a further 0.5 g $NaBH_4$ being added 2 h later. The membrane was incubated for a total of 3.25 h with the reductive agent present. It was washed 6 times with 0.6 L and then 1 L of distilled water passed through the membrane using the membrane filter funnel. The membrane was dried in vacuum over night. A small sample was added to some SCHIFF's reagent and gave a strong purple color. Another sample of the membrane was also cut off to be sent for nitrogen analysis.

Sample L2COA:

5.9 mL of bis(3-aminopropyl)amine was added to 20 mL of methanol. Membrane L2COA was added to the amine solution. 10 mL methanol was added. The membrane was left for more than 3 h before some $NaBH_4$ solution was added. The $NaBH_4$ solution (0.39 g in 10 mL of cold methanol) was added in portions during 30 min. The membrane was washed 1 h after the last $NaBH_4$ addition and the flow was measured (91 s, 96 s at p$\infty$–0.91). The membrane was dried and weighed (49.82 mg; after the sample for SCHIFF's 49.70 mg removed). SCHIFF's reagent gave the membrane sample a very dark purple coloration.

Sample K7COA:

5.9 mL of bis(3-aminopropyl)amine was added to 20 mL of methanol. Membrane K7COA was added to the amine solution. The membrane was left for 3.5 h before some $NaBH_4$ solution, which had been cooled in an ice bath, was added. The $NaBH_4$ solution (0.39 g in 10 mL of methanol) was added in portions, causing the membrane to turn white. The last portion was added about 45 min after the first. The reaction was taken from the ice bath about 15 min after the last $NaBH_4$ addition. The membrane was washed 2.5 h after the last $NaBH_4$ addition. The membrane was dried and weighed (53.32 mg; after the sample for SCHIFF's removed 53.16 mg). A sample was cut off for N-analysis (weight from 53.34 to 43.31 mg). SCHIFF's reagent gave the membrane sample a dark purple coloration.

Sample L4COA:

5.9 mL of bis(3-aminopropyl)amine was added to 20 mL of methanol. Membrane L4COA was wetted in water and added to the amine solution. After 2.5 h a few crystals of $NaBH_4$ were added to the mixture. 0.39 g of $NaBH_4$ was added in portions, starting about 1.5 h after the first $NaBH_4$ addition. The reaction was left over night. 0.20 g $NaBH_4$ was added and the membrane turned partly chalk white again. The membrane was washed 6 h later. Flow times were measured as 74 s and 76 s at p$\infty$–0.93 bar.

Results of Coupling of Ligands with Amine Functions

Small samples of aminated membranes were sent to "MIKRO KEMI AB, Seminariegatan 29, 752 28 UPPSALA, Sweden for nitrogen analysis. The results from the nitrogen analysis for both uncross-linked (U791069_I6A to J8A) and cross-linked membranes (U791075K9COA and U791076_K7COA) can be found in Table 4. The ligand content has been calculated from the nitrogen content.

The two cross-linked membranes, K9COA and K7COA, have higher calculated ligand concentration than any of the uncross-linked membranes (see Table 4). The calculated ligand concentrations for the uncross-linked membranes were all in the range 0.05-0.18 mmol/g dry membrane (see also Table 4). These values were calculated based on the assumptions that the area and volume of the treated membrane was the same as for an untreated membrane. The area and volume of an untreated membrane was calculated by measuring a stack of 10 membranes with a slide-calliper. The membrane volume was 0.19 mL for a dry membrane and 0.21 mL for a wetted membrane.

As this unit is not a common way to give ligand concentration, more common units are shown below:

K9COA (0.96 mmol/g dry weight) corresponds to roughly 240 µmol/mL and 3.4 µmol/cm$^2$ U791076-K7COA (0.32 mmol/g dry weight) corresponds to roughly 80 µmol/mL and 1.1 µmol/cm$^2$ Table 5 presents a summary of the weight changes observed for cross-linked membranes in the course of the above experiments.

Example 4

Direct Coupling of Amine Ligand to Epoxy Activated Membranes

The membrane K10CE was placed in a beaker with 5.0 mL of water and 5.0 mL of ammonia solution (24%) were then added. The beaker was shaken at room temperature for 3 h before washing three times with distilled water (5×50 mL). The resulting membrane K10CEA was dried under vacuum before being sent for elemental analysis.

Elemental analysis on K10CEA: 0.19% of N

Example 5

Direct Coupling of Ligand to Cross-Linked Membranes 0.65 μm CA membranes were cross-linked as described above by treating with NaOH and ECH:

1.0 mL of ECH was dissolved in 100 mL of distilled water. 10 g of sodium sulfate was dissolved in the ECH solution. A 0.65 μm CA membrane was wetted and the flow time was measured. The flow times were 64 s and 64 s at p∞−0.93 bar. The ECH solution was placed in a 47° C. water bath. 0.674 mL NaOH (50% w/w) was dosed with 0.020 mL/min over a period of 34 min. 1.00 mL ECH was then dosed (0.030 mL/min) in parallel with 0.674 mL NaOH (0.020 mL/min). After the dosage the reaction was left at 47° C. over night and after 19 h a further 0.674 mL NaOH was added at a flow rate of 2 mL/min. The membrane was washed repeatedly with distilled water 0.5 h later. The flow time was then measured, with the results 71 s, 77 s, 76 s and 75 s at p∞−0.93 bar.

The membrane was then placed in a 100 mL Duran flask containing 75 mL of an aqueous solution of GMAC (glycidyl trimethylamonium chloride, Degussa AG, Postfach 13 45, D-63403 Hanau), 5 mL of NaOH (50% w/w) and 0.3 g NaBH$_4$. The flask was rotated overnight in a water bath maintained at a temperature of 29° C. The membrane was then removed and washed with distilled water.

The binding capacity of the ligand coupled membrane was then determined using a Metanil Yellow (Aldrich, Cat. No. 20, 202-9) and DNA binding assay.

The Metanil Yellow method was developed based upon the capacity of the membrane to remove the colour from a 25 ppm solution of the dye. The method involved inserting a membrane roundel between two column adaptors in a HR16 column which was attached to an ÄKTA™ chromatography instrument (GE Healthcare). The capacity was investigated by pumping a 25 ppm solution of Metanil Yellow over the membrane until a capacity break trough was obtained.

Capacity was calculated according to:
Area analyzed: 1.5 cm$^2$ (diameter: 1.4 cm).
Molecular weight of Metanil: 375.4 g/mol.
Concentration of solution: 25 ppm $$\text{Capacity} (\mu mol/cm^2) = \frac{\text{Volume absorbed (mL)} \times 25}{375.4 \times 1.5}$$

A DNA binding assay was designed to measure Qb50% for DNA, loaded on to a membrane which was inserted in a HR16 column attached to an ÄKTA™ instrument at a flow rate of 0.5 mL/min. The DNA solution had a concentration of 0.1 mg DNA/mL. The DNA solution was applied to the membrane in a first buffer (buffer A: 25 mM Tris-6M HCl added to adjust to pH 8.0) and eluted with a second buffer (buffer B: 25 mM Tris and 1M NaCl-6M HCl added to adjust pH to 8.0).

Detection is made with a UV-sensor at 280 nm.

Capacity was calculated according to:
Area analyzed: 1.5 cm$^2$ (diameter: 1.4 cm).
Concentration of solution: 0.1 mg/mL $$\text{Capacity} (mgDNA/cm2) = \frac{\text{Volume absorbed (mL)} \times 0.1}{1.5}$$

The membrane was found to have a dynamic flow capacity of 5.7 μmol/cm$^2$ and a DNA capacity of 0.52 mg/cm$^2$. These results were superior to that of the Mustang Q membrane standard (Pall Corporation) which had a dynamic flow capacity of 1.20 μmol/cm$^2$ and a DNA binding capacity of 0.45 mg/cm$^2$.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

TABLE 1

Summary of crosslinking reactions

| Sample | Volume distilled water | Na$_2$SO$_4$ | ECH | NaOH | Post-reaction | Flow time | Pressure | Weight change Crosslinking |
|---|---|---|---|---|---|---|---|---|
| K2C | 100 mL | 0 | 255 μl dissolved | 5 mL 1.0 M | 2 h at 45° C. | 83 s, 86 s | ≈−0.88 bar | −36.1% |
| K7C | 100 mL | 10 g | 2.50 mL dissolved | 1.688 mL 50% w/w dosed, 1 h | >20 h at 47° C. | 69 s, 68 s | ≈−0.88 bar | −35.6% |
| K8C | 100 mL | 0 | 2.50 mL dissolved | 1.688 mL 50% w/w dosed, 1 h | 19 h at 47° C. | 82 s, 83 s | ≈−0.88 bar | −37.1% |
| K9C | 100 mL | 10 g | 1.00 mL dissolved | 0.674 mL 50% w/w dosed, 34 min | 4 h at 47° C. | 71 s, 72 s | ≈−0.88 bar | −37.7% |
| K10C | 100 mL | 10 g | 1.00 mL dissolved | 0.674 mL 50% w/w dosed, 34 min | 1 h at 47° C. | | | |
| K10CE | The solution from K10C | | At 25° C.: 0.50 mL dosed in 20 min + 1.00 mL dosed in 34 min | 0.674 mL 50% w/w dosed in parallel with the last portion of ECH in 34 min | 2 h at 25° C. | 72 s, 73 s | ≈−0.88 bar | −37.4% |

TABLE 2

Summary of crosslinking reactions

| Sample | Volume distilled water | Na$_2$SO$_4$ | ECH | NaOH 50% w/w | Post-reaction | Flow time | Pressure | Weight change Crosslinking |
|---|---|---|---|---|---|---|---|---|
| L1C | 100 mL | 10 g | 1.00 mL dissolved | 0.674 mL dosed, 34 min | 18 h at 25° C. | 87 s, 89 s | ≈−0.91 bar | −37.4% |
| L2C | 100 mL | 10 g | 0.50 mL dissolved | 0.336 mL dosed, 17 min | 17.5 h at 47° C. | 71 s, 73 s | ≈−0.91 bar | −38.2% |
| L3C | 100 mL | 10 g | 1.00 mL dissolved | 0.674 mL dosed, 34 min | 17.25 h at 30° C. | 84 s, 87 s | ≈−0.90 bar | −36.0% |
| L4C | 100 mL | 10 g | 1.00 mL dissolved | 0.674 mL dosed, 34 min | 4 h at 47° C. | 72 s, 73 s | ≈−0.91 bar | −36.6% |
| M1C | 100 mL | 5 g | 1.00 mL dissolved | 0.674 mL dosed, 34 min | 4 h at 47° C. | 77 s, 80 s | ≈−0.92 bar | −37.2% |
| M3C | 100 mL | 10 g | 1.00 mL dissolved | 0.674 mL dosed, 34 min | 4.5 h at 47° C. | 72 s, 73 s | ≈−0.92 bar | −35.8% |
| M5C | 100 mL | 10 g | 2.50 mL dissolved | 1.688 mL dosed, 84 min | 21 h at 47° C. | 57 s, 57 s | ≈−0.91 bar | −34.3% |

TABLE 3

Weight changes and flow times for membranes before and after treatment with 1.0M NaOH

| Sample | Starting material | Flow time Cross-linked | Pressure | Weight change Crosslinking | Flow time after base | Pressure | Weight change Base treatment |
|---|---|---|---|---|---|---|---|
| K2CH | K2C | 83 s, 86 s | ≈−0.88 bar | −36.1% | 100 s, 98 s | ≈−0.88 bar | −9.7% |
| L1CH | L1C | 87 s, 89 s | ≈−0.91 bar | −37.4% | 90 s, 91 s | ≈−0.93 bar | 0.8% |

TABLE 4

Results of elemental analyses

| Sample name | Nitrogen content [weight %] Analysis values | mean | Calculated ligand content mmol/g tot | g ligand/g |
|---|---|---|---|---|
| U791069_I6A | 0.51  0.51 | 0.51 | 0.18 | 0.021 |
| U791069_J5A | 0.4  0.35 | 0.38 | 0.13 | 0.016 |
| U791069_J6A | 0.44  0.42 | 0.43 | 0.10 | 0.013 |
| U791069_J7A | 0.23  0.17 | 0.20 | 0.07 | 0.008 |

TABLE 4-continued

Results of elemental analyses

| Sample name | Nitrogen content [weight %] Analysis values | mean | Calculated ligand content mmol/g tot | g ligand/g |
|---|---|---|---|---|
| U791069_J8A | 0.24  0.21 | 0.23 | 0.05 | 0.007 |
| U791075_K9COA | 4.3; 3.9  4.1; 3.9 | 4.05 | 0.96 | 0.126 |
| U791076_K7COA | 1.20; 1.37  1.47 | 1.35 | 0.32 | 0.042 |

TABLE 5

Summary of weight changes for cross-linked membranes

| XX Sample name | Crosslinking => XXC weight Before [mg] | After [mg] | change | Hydrolysis => XXCH Treatment with 1.0M for 2 h Weight after | change | Oxidation => XXCO (XXCHO) Weight [mg] Before | After | Change | Amination => XXCOA Weight [mg] Before | After | Change |
|---|---|---|---|---|---|---|---|---|---|---|---|
| K2 | 79.90 | 51.05 | −36.1% | 46.12 | −9.7% | | | | | | |
| K7 | 78.41 | 50.53 | −35.6% | | | | 50.3 | | 50.93 | 53.32 | 4.7% |
| K8 | 78.63 | 49.49 | −37.1% | | | | | | | | |
| K9 | 78.84 | 49.12 | −37.7% | | | 49.12 | 48.6 | −1.1% | 48.49 | 52.2 | 7.7% |
| K10 (CE) | 78.74 | 49.33 | −37.4% | | | | | | | | |
| L1 | 78.99 | 49.44 | −37.4% | 49.82 | 0.8% | | | | | | |
| L2 | 78.74 | 48.68 | −38.2% | | | 48.68 | 49 | 0.6% | 48.99 | 49.82 | 1.7% |
| L3 | 78.77 | 50.45 | −36.0% | | | | | | | | |
| L4 | 78.8 | 49.94 | −36.6% | | | | | | 50.2 | 51.73 | 3.0% |
| M1 | 79.35 | 49.8 | −37.2% | | | | | | | | |
| M3 | 79.5 | 51 | −35.8% | | | 51 | 50.2 | −1.5% | | | |
| M5 | 79.2 | 52.01 | −34.3% | | | | | | | | |

What is claimed is:

1. A process for making a porous cross-linked cellulose membrane comprising:
adding a base to a membrane which comprises a plurality of cellulose ester groups in the presence of an aqueous solution of a bifunctional reagent under conditions which allow hydrolysis of said ester groups to hydroxyl groups and cross-linking of said hydroxyl groups with said bifunctional reagent,
wherein said hydrolysis and cross-linking occur substantially simultaneously.

2. The process of claim 1, wherein said base is selected from the group consisting of sodium hydroxide, potassium hydroxide, calcium hydroxide, barium hydroxide, tetraalkylammonium hydroxide, sodium carbonate, caesium carbonate, sodium triphosphate, sodium silicate, potassium carbonate, potassium silicate, potassium triphosphate and sodium hydrogen carbonate.

3. The process of claim 1, wherein said cellulose ester is selected from the group consisting of cellulose acetate, cellulose nitrate, cellulose xanthate, cellulose propionate, cellulose butyrate, cellulose benzoate and a mixture thereof.

4. The process of claim 1, wherein the bifunctional reagent is selected from the group consisting of epichlorohydrin, epibromohydrin, diisocyanate, dimethyl urea, dimethyl ethylene urea, dimethylchlorosilane, bis(2-hydroxy ethyl sulfone), glycidyl ether, butanediol diglycidyl ether, divinylsulfone, alkylene dihalogen and hydroxyalkylene dihalogen.

5. The process of claim 4, wherein said glycidyl ether is selected from the group consisting of butanediol diglycidyl ether, ethylene glycol diglycidyl ether, glycerol diglycidyl ether and polyethylene glycol diglycidyl ether.

6. The process of claim 1, wherein the bifunctional reagent is epicholorhydrin.

7. The process of claim 1, wherein a mixture of bifunctional reagents is used.

8. The process of claim 1, wherein said process is carried out in the presence of an inorganic salt.

9. The process of claim 8, wherein said salt is sodium sulphate.

10. The process of claim 1, further comprising a step of adding a water-miscible solvent to increase the solubility of the bifunctional reagent.

11. The process of claim 10, wherein said water-miscible solvent is selected from the group consisting of alcohol, ketone and ether.

12. The process of claim 10, wherein the water-miscible solvent is added to a final concentration of no more than 50% v/v.

13. The process of claim 1, wherein the membrane comprises a plurality of cellulose acetate groups.

14. The process of claim 1, wherein the membrane comprises a plurality of cellulose acetate groups, the base is sodium hydroxide and the bifunctional reagent is epichlorohydrin.

15. The process of claim 14, wherein said process is carried out at a temperature of 45° C. to 55° C. for a period of at least 1 hour.

16. The process of claim 1, wherein the bifunctional reagent is epichlorohydrin, said process further comprising the step of adding additional aqueous epichlorohydrin solution and base under conditions which allow hydrolysis of the ester groups to hydroxyl groups and epoxy activation of said hydroxyl groups with epichlorohydrin to produce an epoxy activated cross-linked cellulose membrane.

17. The process of claim 16, further comprising the step of coupling a chromatography ligand to said epoxy activated cross-linked cellulose membrane.

18. The process of claim 17, wherein said ligand comprises an amine or thiol group.

19. The process of claim 18, wherein said amine is ammonia.

20. The process of claim 1, further comprising the step of coupling a chromatography ligand to the cross-linked cellulose membrane.

21. The process of claim 20, wherein said coupling involves a first oxidation step and a second reductive amination step.

22. The process of claim 21, wherein said first oxidation step comprises treatment of the membrane with a periodate solution.

23. The process of claim 21, wherein said second reductive amination step comprises treatment of the membrane with sodium borohydride ($NaBH_4$).

24. The process of claim 20, wherein said ligand comprises an amine.

25. The process of claim 24, wherein said amine is a secondary amine.

26. The process of claim 25, wherein said secondary amine is bis(3-aminopropyl)amine.

27. The process of claim 20, wherein said ligand comprises a glycidyl quaternary ammonium compound.

28. The process of claim 27, wherein the coupling involves use of a base in the presence of a reducing agent.

29. The process of claim 28, wherein the reducing agent is sodium borohydride.

30. The process of claim 28, wherein the base is sodium hydroxide.

31. The process of claim 27, wherein said glycidyl quaternary ammonium compound is glycidyl trimethyl ammonium chloride (GMAC).

* * * * *